(12) United States Patent
Winkler et al.

(10) Patent No.: US 9,139,763 B2
(45) Date of Patent: Sep. 22, 2015

(54) SURFACE-MODIFIED PHOSPHORS

(75) Inventors: Holger Winkler, Darmstadt (DE);
Reinhold Rueger, Roedermark (DE);
Ralf Petry, Griesheim (DE); Tim Vosgroene, Ober-Ramstadt (DE);
Walter Tews, Greifswald (DE)

(73) Assignee: MERCK PATENT GMBH, Darmstadt (DE)

( * ) Notice: Subject to any disclaimer, the term of this patent is extended or adjusted under 35 U.S.C. 154(b) by 307 days.

(21) Appl. No.: 12/744,252

(22) PCT Filed: Oct. 23, 2008

(86) PCT No.: PCT/EP2008/008973
§ 371 (c)(1),
(2), (4) Date: May 21, 2010

(87) PCT Pub. No.: WO2009/065480
PCT Pub. Date: May 28, 2009

(65) Prior Publication Data
US 2010/0259156 A1 Oct. 14, 2010

(30) Foreign Application Priority Data
Nov. 22, 2007 (DE) .......... 10 2007 056 343

(51) Int. Cl.
*H01J 63/04* (2006.01)
*C09K 11/02* (2006.01)
*C09K 11/77* (2006.01)

(52) U.S. Cl.
CPC .......... *C09K 11/025* (2013.01); *C09K 11/7734* (2013.01); *C09K 11/7774* (2013.01); *C09K 11/7792* (2013.01)

(58) Field of Classification Search
CPC ...................................... C09K 11/025
USPC ................................... 313/503–504
See application file for complete search history.

(56) References Cited

U.S. PATENT DOCUMENTS

2001/0042853 A1* 11/2001 Hampden-Smith et al. ............ 252/301.4 R
2001/0049912 A1* 12/2001 Motonari et al. ............. 51/307

(Continued)

FOREIGN PATENT DOCUMENTS

JP 0816216 A 1/1996
JP 2002-174699 6/2002

(Continued)

OTHER PUBLICATIONS

Liu, Ying Ling and Shu-Hsien Li. "Poly(dimethylsiloxane) Star Polymers Having Nanosized Silica Cores." (Macromolecular Rapid Communications), Jun. 7, 2004, 1392-1395, No. 25.

(Continued)

*Primary Examiner* — Anh Mai
*Assistant Examiner* — Hana Featherly
(74) *Attorney, Agent, or Firm* — Millen, White, Zelano & Branigan, P.C.

(57) ABSTRACT

The invention relates to surface-modified phosphor particles based on luminescent particles of $(Ca,Sr,Ba)_2SiO_4$ and/or other silicates, in each case individually or mixtures thereof with one or more activator ions, such as Eu, Mn, Ce and/or Mg and/or Zn, where at least one metal, transition-metal or semi-metal oxide coating and an organic coating are applied to the luminescent particles, and to a preparation process.

22 Claims, 2 Drawing Sheets

(56) References Cited

U.S. PATENT DOCUMENTS

| | | | |
|---|---|---|---|
| 2006/0050081 A1* | 3/2006 | Kobayashi et al. | 345/597 |
| 2007/0034887 A1* | 2/2007 | Pang et al. | 257/98 |
| 2007/0046176 A1* | 3/2007 | Bukesov et al. | 313/496 |
| 2007/0241666 A1 | 10/2007 | Jang et al. | |
| 2008/0284306 A1 | 11/2008 | Hildenbrand et al. | |
| 2010/0194263 A1 | 8/2010 | Winkler et al. | |
| 2010/0201250 A1 | 8/2010 | Winkler et al. | |
| 2013/0065993 A1* | 3/2013 | Backer et al. | 524/87 |

FOREIGN PATENT DOCUMENTS

| | | |
|---|---|---|
| JP | 2003-31367 | 1/2003 |
| JP | 2006-008838 | 1/2006 |
| JP | 2007-016195 | 1/2007 |
| JP | 2010-523739 | 7/2010 |
| JP | 2010-523740 | 7/2010 |
| WO | 9837165 A1 | 8/1998 |
| WO | WO 2005078048 A1 * | 8/2005 |
| WO | WO2007/054875 | 5/2007 |
| WO | WO 2008122331 A1 * | 10/2008 |
| WO | PCTEP0808973 R | 2/2009 |

OTHER PUBLICATIONS

Wang, Yun-Pu et al. "Synthesis of well-defined, polymer-grafted silica nanoparticles via reverse ATRP." (European Polymer Journal), Jan. 30, 2005, 1326-1332, 41:30.

Office Action for related Japanese Application No. 2010-534385, dated Mar. 26, 2013.

English Translation of Office Action for related Japanese Application No. 2010-534385, dated Mar. 26, 2013.

Machine Translation of JP2003-031367, publication date Jan. 31, 2003.

Office Action for related Japanese Patent Application No. 2010-534385 dated Jan. 7, 2014.

English Mechanical Translation of JP2002-174699, dated Jun. 21, 2002.

English Mechanical Translation of JP2006-008838A, dated Jan. 12, 2006.

English Mechanical Translation of JP2007-016195, dated Jan. 25, 2007.

Sekisui Plant Syst KK; "Double Shell Control Box"; Espacenet; dated Jan. 19, 1996, English Abstract of JPH0816216.

* cited by examiner

SURFACE-MODIFIED PHOSPHORS

The invention relates to surface-modified phosphor particles based on luminescent particles of $(Ca,Sr,Ba)_2SiO_4$ and/or other silicates, where at least one metal, transition-metal or semimetal oxide layer and an organic coating are applied to the luminescent particles, and to a preparation process.

During curing of the resin which contains the LED phosphors, sedimentation of the phosphor particles occurs. As a consequence, an inhomogeneous and unreproducible distribution of the phosphors over the LED Chip or in the remote phosphor layer arises. As a result, the LEDs have large differences in light distribution; both the distribution over an LED is highly angle-dependent, and also the light properties are not uniform from LED to LED within a batch. LED manufacturers are therefore forced to carry out complex and costly binning, which results in low yields of saleable LEDs (the target bin with light properties which meet the requirements has a yield of up to approximately 10% of total production. The remaining white LEDs are either destroyed or sold at low prices as "open bin" often under secondary brand names for undemanding applications). This expense becomes clear from the price differences between blue LEDs and white phosphor-containing LEDs, which can be up to 100%. The high initial costs of the white LEDs are in turn hindering rapid replacement of inefficient and short-lifetime incandescent bulbs, halogen lamps and fluorescent lamps by white LEDs.

Functionalisation of phosphors has already been described in the literature. In A. Meijerink et al, *Phys. Chem. Chem. Phys.*, 2004, 6, 1633-1636, it is described how nanophosphors which have a reactive surface (intrinsic property of nanoparticles which have a large surface area to volume ratio and saturate the high surface energy with bonds of any type) are bonded to tetramethylrhodamine (dye) with glycine as linker in order to observe charge transfer. However, the process described is unsuitable for bonding phosphors to resins and for achieving compatiblisation.

It is known from Y. T. Nien et al. *Materials Chemistry and Physics*, 2005, 93, 79-83, how nanophosphors are embedded in HMDS (hexamethyldisilazane) in order to saturate the reactive and unstable surface. In this case, no bonding takes place, but instead merely embedding of the nanophosphor in an $SiO_2$ matrix.

US 2007/0092758 discloses a phosphor paste which consists of a phosphor, a silane-containing dispersant and an organic resin. The phosphor, dispersant and binder are mixed, and the phosphor is dispersed in the binder. The dispersants used consist of a specific hydrophobic organic radical, a hydrophobic group and a silanol anchor group bonded to the hydrophilic group. For homogeneous distribution of the phosphor, it is necessary, despite the added dispersants, to subject the paste to grinding. This can result in impairment of the properties of the phosphor, for example due to the high energy input or due to contamination from the grinding media material.

The object to the present invention consisted firstly in avoiding the above-mentioned disadvantages, such as inhomogeneous and unreproducible distribution of the phosphor particles over the LED Chip, and on the other hand in preparing a phosphor which can be embedded easily in various binder systems.

Surprisingly, it has now been found that this inhomogeneity of light distribution, which is caused by inhomogeneous phosphor layer, is avoided by compatiblisation of the phosphor surface with the silicone or epoxy resin. During the compatiblisation, the surface of the phosphor is provided with functional chemical groups and linkers. These allow the phosphor particles to be matched to the hydrophilic or hydrophobic properties of the resin. This enables the preparation of homogeneous mixtures of resin and phosphor which do not tend to flocculate out.

The present invention thus relates to surface-modified phosphor particles based on luminescent particles which comprise at least one luminescent compound selected from the group of $(Ca,Sr,Ba)_2SiO_4$ and other silicates, in each case individually or mixtures thereof with one or more activator ions, such as Ce, Eu, Mn and/or Mg and/or Zn, where at least one metal, transition-metal or semimetal oxide layer and an organic coating are applied to the luminescent particles.

The luminescent particles preferably comprise at least one luminescent compound selected from the group $$Ba_uSr_vZn_wEu_xSiO_4 \qquad (II)$$

and/or $$Ba_uSr_vCa_wEu_xSiO_4 \qquad (III)$$

where $u+v+w+x=2$.

The functional groups on the surface of the phosphor form an entanglement and/or crosslinking or chemical bonding to the components of the resin. In this way, a homogeneous distribution of the phosphor particles can be fixed in the resin. During the resin curing process, no sedimentation of the phosphor particles occurs. In particular in the case of phosphors having high homogeneity of the particle properties (for example morphology, particle-size distribution) prepared by wet-chemical methods, phosphor layers which are advantageous in accordance with the invention can be achieved.

The CCT (correlated colour temperature) of the LEDs according to the invention is homogeneous over the entire angle range, i.e. the observer perceives the same colour temperature ("light colour") in any position. By contrast, the white LEDs provided with conventional phosphors (prepared by mix & fire) have large variance of the CCT, meaning that the observer perceives a different light colour in different directions.

During the functionalisation or surface modification, firstly reactive hydroxyl groups are formed on the surface of the phosphor particles by a metal, transition-metal or semimetal oxide by wet-chemical or vapour-deposition (CVD) processes.

The metal, transition-metal or semimetal oxide preferably comprises nanoparticles and/or layers of oxides/hydroxides of Si, Al, Zr, Zn, Ti and/or mixtures thereof. A silicon oxide/hydroxide coating is particularly preferred since it has a particularly large number of reactive hydroxyl groups, simplifying further addition of an organic coating.

The metal, transition-metal or semimetal oxide coating is preferably substantially transparent, i.e. it must guarantee 90% to 100% transparency both for the excitation spectrum and also for the emission spectrum of the respective conversion phosphors employed. On the other hand, the transparency of the coating according to the invention can also be less than 90% to 100% for all wavelengths which do not correspond to the excitation and emission wavelengths.

The coated phosphor particles are then provided with an organic, preferably substantially transparent coating, preferably of organosilanes or polyorganosiloxanes (silicones) and/or mixtures thereof. This coating is also carried out by wet-chemical methods or by a vapour-deposition process. The organosilicon compounds react here with the surface OH groups of the phosphor particles or with the inorganic coating. The chains of the organosilicon compound form a more or less porous layer around the phosphor particles. By modification of the organic chains of the silicon compounds, the desired hydrophobicity of the phosphor particles, the structure of the oligomer/polymer chains and the coupling (physical and/or chemical) to the resin are controlled.

The organosilanes employed are preferably alkoxysilanes.

Examples of organosilanes are propyltrimethoxysilane, propyltriethoxysilane, isobutyltrimethoxysilane, n-octyltrimethoxysilane, i-octyltrimethoxysilane, n-octyltriethoxysilane, n-decyltrimethoxysilane, dodecyltrimethoxysilane, hexadecyltrimethoxysilane, vinyltrimethoxysilane, preferably n-octyltrimethoxysilane and n-octyltriethoxysilane. Suitable oligomeric, alcohol-free organosilane hydrolysates are, inter alia, the products marketed by Sivento under the trade name "Dynasylan®", such as, for example, Dynasylan HS 2926, Dynasylan HS 2909, Dynasylan HS 2907, Dynasylan HS 2781, Dynasylan HS 2776, Dynasylan HS 2627. In addition, oligomeric vinylsilane and aminosilane hydrolysate are suitable as organic coating. Functionalised organosilanes are, for example, 3-aminopropyltrimethoxysilane, 3-methacryloxytrimethoxysilane, 3-glycidyloxypropyltrimethoxysilane, beta-(3,4-epoxycyclohexyl)ethyltrimethoxysilane, gamma-isocyanatopropyltrimethoxysilane, 1,3-bis(3-glycidoxypropyl)-1,1,3,3-tetramethyldisiloxane, ureidopropyltriethoxysilane, preferably 3-aminopropyltrimethoxysilane, 3-methacryloxytrimethoxysilane, 3-glycidyloxypropyltrimethoxysilane, beta-(3,4-epoxycyclohexyl)ethyltrimethoxysilane, gamma-isocyanatopropyltrimethoxysilane.

Particular preference is given to the use of the following compounds, alone or in mixtures:

Silquest A-186® [beta-(3,4-epoxycyclohexyl)ethyltrimethoxysilane]
Silquest A-1310® gamma-isocyanatopropyltriethoxysilane
Silquest A-1110® gamma-aminopropyltrimethoxysilane
Silquest A-1524® gamma-ureapropyltrimethoxysilane
Silquest A-174® gamma-methacryloxypropyltrimethoxysilane
Silquest A-151® vinyltriethoxysilane Examples of polymeric silane systems and polyorganosiloxanes are described in WO 98/13426 and are marketed, for example, by Sivento under the trade name Hydrosil®.

The choice of a suitable silane is dependent, inter alia, on whether the Mane is to be bonded to an epoxy resin or to a silicone resin. For highpower LEDs (with electrical connected load of min. 1 W), a silicone resin with long-term radiation and temperature stability will be used, whereas for low- or medium-power LEDs (electrical connected load<1 W), as are suitable, for example, for backlighting applications, an epoxy resin with lower radiation and temperature stability will be selected.

The particle size of the phosphors according to invention is between 1 μm and 40 μm, preferably between 2 μm and 20 μm.

The thickness of the coating according to invention, consisting of inorganic and organic coatings, is between 5 nm and 200 nm, preferably 10 nm and 50 nm. The particle size of the primary particles of the metal, transition-metal or semimetal oxide coating is between 5 nm and 50 nm. The coating according to the invention is not automatically homogeneous, but instead may also be in the form of islands or in droplet form on the surface of the particles. The thickness of the organic coating depends on the molecular weight of the organic groups and can be between 0.5 nm and 50 nm, preferably between 1 and 5 nm.

The amount of the organic coating is between 0.02% by weight and 5% by weight, based on the surface-coated phosphor particles, preferably 0.1 to 2% by weight.

The present invention furthermore relates to a process for the preparation of a surface-modified phosphor particle, characterised by the steps:

a. preparation of a phosphor particle by mixing at least two starting materials and at least one dopant and thermal treatment at a temperature T>150° C.,
b. the phosphor particle is coated with a metal, transition-metal or semimetal oxide in a wet-chemical or vapour-deposition process,
c. application of an organic coating.

The coating of the phosphor particles is particularly preferably carried out by wet-chemical methods by precipitation of the metal, transition-metal or semimetal oxides or hydroxides in aqueous dispersion. To this end, the uncoated phosphor is suspended in water in a reactor and coated with the metal oxide or hydroxide by simultaneous metered addition of at least one metal salt and at least one precipitant with stirring.

As an alternative to metal salts, it is also possible to meter in organometallic compounds, for example metal alkoxides, which then form metal oxides or hydroxides by hydrolytic decomposition. Another possible method of coating the particles is coating via a sol-gel process in an organic solvent, such as, for example, ethanol or methanol. This process is particularly suitable for water-sensitive materials and for acid- or alkali-sensitive substances.

The starting materials for the preparation of the phosphor consist, as mentioned above, of the base material (for example salt solutions of aluminium, yttrium and cerium) and at least one dopant, preferably europium or cerium, and optionally further Gd-, Lu-, Sc-, Sm-, Tb-, Pr- and/or Ga-containing materials. Suitable starting materials are inorganic and/or organic substances, such as nitrates, carbonates, hydrogencarbonates, phosphates, carboxylates, alcoholates, acetates, oxalates, halides, sulfates, organometallic compounds, hydroxides and/or oxides of the metals, semimetals, transition metals and/or rare-earth metals, which are dissolved and/or suspended in inorganic and/or organic liquids. Preference is given to the use of mixed nitrate solutions, chloride or hydroxide solutions which contain the corresponding elements in the requisite stoichiometric ratio.

Wet-chemical preparation generally has the advantage over the conventional solid-state diffusion ("mixing and firing") method that the resultant materials have greater uniformity with respect to the stoichiometric composition, the particle size and the morphology of the particles from which the phosphor according to the invention is prepared.

For wet-chemical preparation of a phosphor particle consisting, for example, of a mixture of barium nitrate, strontium nitrate, highly disperse silicon dioxide, ammonium chloride and europium nitrate hexahydrate solution, the following known methods are preferred:

coprecipitation with an $NH_4HCO_3$ solution (see, for example, *Jander, Blasius Lehrbuch der analyt. u. präp. anorg. Chem. [Textbook of Analyt. and Prep. Inorg. Chem.]* 2002)
Pecchini method using a solution of citric acid and ethylene glycol (see, for example, *Annual Review of Materials Research* Vol. 36: 2006, 281-331)
combustion method using urea
spray-drying of aqueous or organic salt solutions (starting materials)
spray pyrolysis of aqueous or organic salt solutions (starting materials)

In the above-mentioned coprecipitation, which is particularly preferred in accordance with the invention, an $NH_4HCO_3$ solution is added to, for example, chloride or nitrate solutions of the corresponding phosphor starting materials, resulting in the formation of the phosphor precursor.

In the Pecchini method, a precipitation reagent consisting of citric acid and ethylene glycol is added, for example, to the above-mentioned nitrate solutions of the corresponding phosphor starting materials at room temperature, and the mixture is subsequently heated. Increasing the viscosity results in phosphor precursor formation.

In the known combustion method, the above-mentioned nitrate solutions of the corresponding phosphor starting materials are, for example, dissolved in water, then boiled under reflux and treated with urea, resulting in the slow formation of the phosphor precursor.

Spray pyrolysis is one of the aerosol methods, which are characterised by spraying solutions, suspensions or dispersions into a reaction space (reactor) heated in various ways and the formation and deposition of solid particles. In contrast to spray-drying using hot-gas temperatures<200° C., thermal decomposition of the starting materials used (for example salts) and the re-formation of substances (for example oxides, mixed oxides) additionally occur, in addition to evaporation of the solvent, in spray pyrolysis as a high-temperature process.

The 5 method variants mentioned above are described in detail in DE 102006027133.5 (Merck), which is incorporated into the context of the present application in its full scope by way of reference.

The surface-modified phosphor particles according to the invention can be prepared by various wet-chemical methods by
1) homogeneously precipitating the constituents, then separating off the solvent, followed by a single- or multistep thermal aftertreatment, where one of these steps may be carried out in a reducing atmosphere,
2) finely dividing the mixture, for example with the aid of a spray process, and removing the solvent, followed by a single- or multistep thermal aftertreatment, where one of these steps may be carried out in a reducing atmosphere, or
3) finely dividing the mixture, for example with the aid of a spray process, and removing the solvent in association with pyrolysis, followed by a single- or multistep thermal aftertreatment, where one of these steps may be carried out in a reducing atmosphere,
4) subsequently wet-chemical coating the phosphors prepared with the aid of methods 1-3.

The wet-chemical preparation of the phosphor is preferably carried out by the precipitation and/or sol-gel method.

In the above-mentioned thermal aftertreatment, it is preferred for the calcination to be carried out at least partly under reducing conditions (for example using carbon monoxide, forming gas, pure hydrogen, mixtures of hydrogen with an inert gas or at least a vacuum or oxygen-deficient atmosphere).

In general, it is also possible to prepare the uncoated phosphors according to the invention by the solid-state diffusion method, but this causes the disadvantages already mentioned.

The above-mentioned processes enable any desired outer shapes of the phosphor particles to be produced, such as spherical particles, flakes or structured materials and ceramics.

In addition, the phosphors according to the invention can be excited over a broad range which extends from about 250 nm to 560 nm, preferably 380 nm to about 500 nm. These phosphors are thus suitable for excitation by UV- or blue-emitting primary light sources, such as LEDs or conventional discharge lamps (for example based on Ng).

The present invention furthermore relates to an illumination unit having at least one primary light source whose emission maximum is in the range 250 nm to 530 nm, preferably 380 nm to about 500 nm, where the primary radiation is partially or fully converted into longer-wavelength radiation by the surface-modified phosphors according to the invention. This illumination unit preferably emits white light or emits light having a certain colour point (colour-on-demand principle).

In a preferred embodiment of the illumination unit according to the invention, the light source is a luminescent indium aluminium gallium nitride, in particular of the formula $In_i Ga_j Al_k N$, where $0 \leq j$, $0 \leq k$, $0 \leq k$, and $i+j+k=1$. Possible forms of light sources of this type are known to the person skilled in the art. They can be light-emitting LED chips having various structures.

In a further preferred embodiment of the illumination unit according to the invention, the light source is a luminescent arrangement based on ZnO, TCO (transparent conducting oxide), ZnSe or SiC or an arrangement based on an organic light-emitting layer (OLED).

In a further preferred embodiment of the illumination unit according to the invention, the light source is a source which exhibits electroluminescence and/or photoluminescence. The light source may furthermore also be a plasma or discharge source.

The phosphors according to the invention can either be dispersed in a resin (for example epoxy or silicone resin) or, given suitable size ratios, arranged directly on the primary light source or, depending on the application, arranged remote therefrom (the latter arrangement also includes "remote phosphor technology"). The advantages of remote phosphor technology are known to the person skilled in the art and are revealed, for example, in the following publication: Japanese Journ. of Appl. Phys. Vol. 44, No. 21 (2005). L649-L651.

In a further embodiment, it is preferred for the optical coupling of the illumination unit between the coated phosphor and the primary light source to be achieved by means of a light-conducting arrangement. This enables the primary light source to be installed at a central location and to be optically coupled to the phosphor by means of light-conducting devices, such as, for example, light-conducting fibres. In this way, lamps matched to the illumination wishes and merely consisting of one or different phosphors, which may be arranged to form a light screen, and a light conductor, which is coupled to the primary light source, can be achieved. In this way, it is possible to position a strong primary light source at a location which is favourable for the electrical installation and to install lamps comprising phosphors which are coupled to the light conductors at any desired locations without further electrical cabling, but instead only by laying light conductors.

The present invention furthermore relates to the use of the phosphors according to the invention for partial or complete conversion of the blue or near-UV emission from a luminescent diode.

The present invention furthermore relates to the use of the phosphors according to the invention in electroluminescent materials, such as, for example, electroluminescent films (also known as lighting films or light films), in which, for example, zinc sulfide or zinc sulfide doped with $Mn^{2+}$, $Cu^+$ or $Ag^+$ is employed as emitter, which emit in the yellow-green region. The areas of application of the electroluminescent film are, for example, advertising, display backlighting in liquid-crystal display screens (LC displays) and thin-film transistor (TFT) displays, self-illuminating vehicle license plates, floor graphics (in combination with a crush-resistant and slip-proof laminate), in display and/or control elements, for example in automobiles, trains, ships and aircraft, or also domestic appliances, garden equipment, measuring instruments or sport and leisure equipment.

The following examples are intended to illustrate the present invention. However, they should in no way be regarded as limiting. All compounds or components which can be used in the compositions are either known and commercially available or can be synthesised by known methods. The temperatures indicated in the examples are always given in ° C. It furthermore goes without saying that, both in the description and also in the examples, the added amounts of the components in the compositions always add up to a total of 100%. Percentage data given should always be regarded in the given connection. However, they usually always relate to the weight of the part-amount or total amount indicated.

EXAMPLES

Working Example 1a

Coating of a Phosphor Powder with $SiO_2$
(Generation of Active Hydroxyl Groups)

50 g of a phosphor comprising $Ba_2SiO_4$:Eu are suspended in 1 liter of ethanol in a 2 l reactor with ground-glass lid, heating mantle and reflux condenser. A solution of 17 g of ammonia water (25% by weight of $NH_3$) in 70 ml of water and 100 ml of ethanol is added. A solution of 48 g of tetraethyl orthosilicate (TEOS) in 48 g of anhydrous ethanol is slowly added dropwise (about 1 ml/min) at 65° C. with stirring. When the addition is complete, the suspension is stirred for a further 2 hours, brought to room temperature and filtered. The residue is washed with ethanol and dried.

Working Example 1b

Coating of a Phosphor Powder with $SiO_2$
(Generation of Active Hydroxyl Groups 50 g of a phosphor comprising $Ba_{0.342}Sr_{1.6}Eu_{0.055}Zn_{0.003}SiO_4$:Eu are suspended in 1 liter of ethanol in a 2 l reactor with ground-glass lid, heating mantle and reflux condenser. A solution of 17 g of ammonia water (25% by weight of $NH_3$) in 70 ml of water and 100 ml of ethanol is added. A solution of 48 g of tetraethyl orthosilicate (TEOS) in 48 g of anhydrous ethanol is slowly added dropwise (about 1 ml/min) at 65° C. with stirring. When the addition is complete, the suspension is stirred for a further 2 hours, brought to room temperature and filtered. The residue is washed with ethanol and dried.

Working Example 1c

Coating of a Phosphor Powder with $SiO_2$
(Generation of Active Hydroxyl Groups)

50 g of a phosphor comprising $Ba_{0.09}Sr_{1.18}Ca_{0.52}Eu_{0.21}SiO_4$ are suspended in 1 liter of ethanol in a 2 l reactor with ground-glass lid, heating mantle and reflux condenser. A solution of 17 g of ammonia water (25% by weight of $NH_3$) in 70 ml of water and 100 ml of ethanol is added. A solution of 48 g of tetraethyl orthosilicate (TEOS) in 48 g of anhydrous ethanol is slowly added dropwise (about 1 ml/min) at 65° C. with stirring. When the addition is complete, the suspension is stirred for a further 2 hours, brought to room temperature and filtered. The residue is washed with ethanol and dried.

Working Example 2

Coating of a Phosphor with $Al_2O_3$ 50 g of $Ba_2SiO_4$:Eu phosphor are suspended in 950 g of ethanol in a glass reactor with heating mantle. 600 g of an ethanolic solution of comprises 98.7 g of $AlCl_3*6H_2O$ per Kg of solution are metered into the suspension at 80° C. with stirring over the course of 2½ hours. During this addition, the pH is kept constant at 6.5 by metered addition of sodium hydroxide solution. When the metered addition is complete, the mixture is stirred at 80° C. for a further 1 hour, then cooled to room temperature, and the phosphor is filtered off, washed with ethanol and dried.

Coating of the Phosphor from Examples 1a to c
and/or 2 with Functional Groups

Working Example 3a

Silanes for Epoxy Polymers (Hydrophilic Variant,
GE Silanes, Epoxysilane; Suitable for Epoxy Resins)

100 g of the phosphor or of the surface-modified $Ba_2SiO_4$: Eu phosphor are suspended in 1350 ml of deionised water with vigorous stirring. The pH of the suspension is adjusted to pH=6.5 using 5% by weight $H_2SO_4$, and the suspension is heated to 75° C. 4.0 g of a 1:1 mixture of Silquest A-186® [beta-(3,4-epoxycyclohexyl)ethyltrimethoxysilane] and Silquest A-1310® [gamma-isocyanatopropyltriethoxysilane] are subsequently metered into the suspension over the course of 60 min with moderate stirring. When the addition is complete, the mixture is subsequently stirred for 15 min in order to complete the coupling of the silanes to the surface. The pH is corrected to 6.5 by means of 5% by weight $H_2SO_4$.

The suspension is subsequently filtered and washed with deionised water until salt-free. Drying is carried out for 20 h at 130° C. The phosphor powder obtained in this way is then sieved by means of a 20 μm sieve.

Working Example 3b

Silanes Specifically for Silicone-Phosphor Coupling 100 g of the surface-modified $Ba_2SiO_4$:Eu phosphor are suspended in 1350 ml of deionised water with vigorous stirring. The pH of the suspension is adjusted to pH=6.5 by means of 5% by weight $H_2SO_4$, and the suspension is heated to 75° C. 6.0 g of a 1:2 mixture of Silquest A-1110® [gamma-aminopropyltrimethoxysilane] and Silquest A-1524® [gamma-ureapropyl-trimethoxysilane] are subsequently metered into the suspension over the course of 75 min with moderate stirring. When the addition is complete, the mixture is subsequently stirred for 15 min in order to complete the coupling of the silanes to the surface. The pH is corrected to 6.5 by means of 5% by weight $H_2SO_4$.

The suspension is subsequently filtered and washed with deionised water until salt-free. The drying is carried out for 20 h at 140° C. The phosphor powder obtained in this way is then sieved by means of a 20 µm sieve.

Working Example 3c

Vinylsilane for Silicone-Phosphor Coupling 100 g of the surface-modified $Ba_2SiO_4$:Eu phosphor are suspended in 1350 ml of deionised water with vigorous stirring. The pH of the suspension is adjusted to pH=6.8 by means of 5% by weight $H_2SO_4$, and the suspension is heated to 75° C. 6.0 g of a 1:2 mixture of Silquest A-174® [gamma-methacryloxypropyltrimethoxysilane] and Silquest A-151® [vinyltriethoxysilane] are subsequently metered into the suspension over the course of 90 min with moderate stirring. When the addition is complete, the mixture is subsequently stirred for 15 min in order to complete the coupling of the silanes to the surface. The pH is corrected to 6.5 by means of 5% by weight $H_2SO_4$.

The suspension is subsequently filtered and washed with deionised water until salt-free. The drying is carried out for 20 h at 140° C. The phosphor powder obtained in this way is then sieved by means of a 20 µm sieve.

Working Example 4

Production of an LED

The following mixtures are prepared in a Speedmixer® (speed 3000 rpm, timer duration: 5 min, room temperature):

50 ml of the two resin components JCR 6122 a and b are in each case mixed with 8% by weight of the phosphor powder compatiblised in accordance with Example 3a, b or c and 1.2% of silicic acid powder having an average diameter of 0.5 µm. The two resin mixtures are combined, stirred and degassed. 10 ml are then introduced into the stock tank of a jet dispenser or screw metering valve dispenser. Bonded COB (chip on board) crude LED packages are placed below the dispensing valve. Glob tops comprising the resin mixture are then dripped onto the chips of the crude LED packages by means of the dispenser. These coated LEDs are conditioned at 150° C. for 1 hour in a drying cabinet. The resin cures in the process.

DESCRIPTION OF THE FIGURES

The invention will be explained in greater detail below with reference to a number of illustrative embodiments. The figures show the following.

Figure 1:
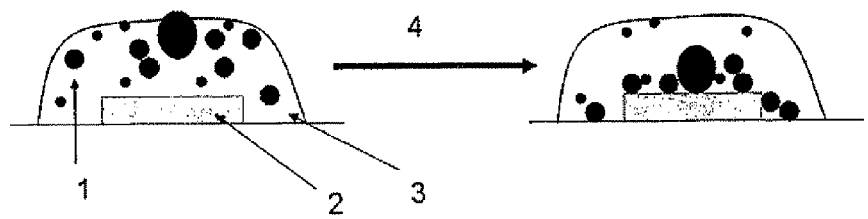
FIG. 1: Phosphors (1) prepared by "mix & fire" incorporated in resin (3) above the LED chip (2). The diagram on the left represents the state immediately after application of the phosphor/resin mixture to the chip. After curing of the resin (4), the state of the phosphor/resin mixture is as follows (right-hand diagram): the larger phosphor particles exhibit a strong tendency towards sedimentation. The particles consequently distribute themselves inhomogeneously. This distribution is "frozen" after solidification of the resin.
Figure 2:
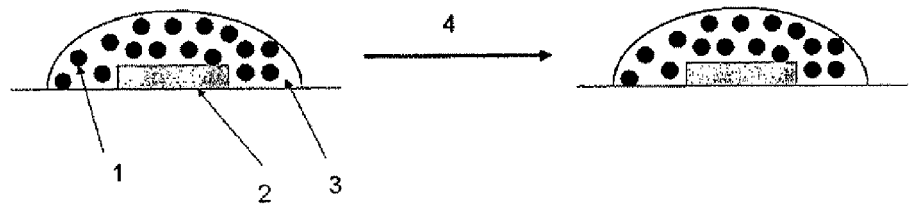
FIG. 2: Phosphor powders (1) prepared by wet-chemical methods incorporated in resin (3) above the LED chip (2). The left-hand figure shows the homogeneous distribution of the uniform phosphor powders. This homogeneity is facilitated by the compatiblisation according to the invention of the phosphor surface with the resin properties. During curing, the distribution is not affected since the phosphors are, in accordance with invention, crosslinked with or chemically bonded to the resin. In conclusion, the phosphor layer above the LED is uniform (see right-hand figure).
Figure 3:
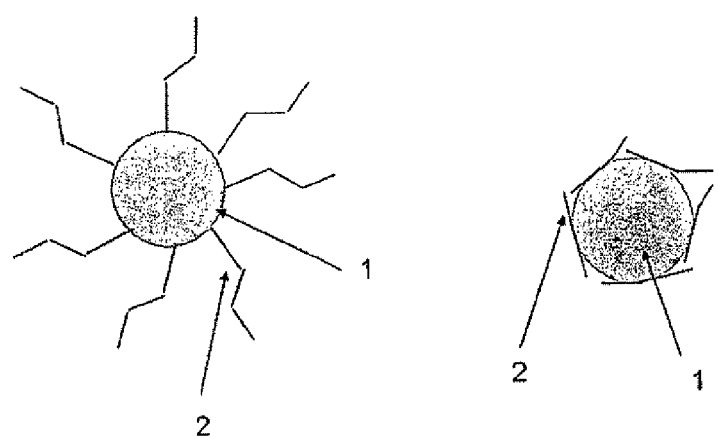
FIG. 3: shows silicone- or silane-coated phosphor particles (1) having two different structures with respect to the polymer chains (2). On the one hand, the surface-bonded polymer chains improve the dispersibility of the phosphor particles in the resin. On the other hand, the polymer chains can act as "spacers" and thus hinder agglomeration of phosphor particles. Furthermore, bonding of the compatiblised phosphor particles to the resin (crosslinking or reaction with constituents of the resin) is achieved.

The invention claimed is:

1. Surface-modified phosphor particles comprising luminescent particles which in turn comprise at least one luminescent compound that is $(Ca,Sr,Ba)_2SiO_4$ or other silicates, in each case individually or mixtures thereof with one or more activator ions,
   wherein both at least one metal, transition-metal or semi-metal oxide layer and an organic coating are applied to the luminescent particles, and wherein the organic coating comprises at least one alkoxysilane, polyorganosilaxane or mixtures thereof.

2. The surface-modified phosphor particles according to claim 1, wherein the luminescent particles comprise at least one luminescent compound that is $$Ba_uSr_vZn_wEu_xSiO_4 \quad (II),$$

$$Ba_uSr_vCa_wEu_xSiO_4 \quad (III)$$

or mixtures thereof,
where u+v+w+x=2.

3. The surface-modified phosphor particles according to claim 1, wherein the metal, transition-metal or semimetal oxide layer comprises oxides/hydroxides of Si, Al, Zr, Zn, Ti or mixtures thereof.

4. The surface-modified phosphor particles according to claim 1, wherein the particle size of the phosphor particles is between 1 and 40 µm.

5. The surface-modified phosphor particles according to claim 1, wherein the metal, transition-metal or semimetal oxide coating and the organic coating are substantially transparent.

6. A process for the preparation of a surface-modified phosphor particle according to claim 1, comprising:
   a) preparing a phosphor particle by mixing at least two starting materials and at least one dopant and thermal treatment at a temperature T>150° C.,
   b) coating of the phosphor particle with a metal, transition-metal or semimetal oxide in a wet-chemical or vapour-deposition process,
   c) application of an organic coating.

7. The process according to claim 6, wherein the metal, transition-metal or semimetal oxide and the organic coating are substantially transparent.

8. The process according to claim 6, wherein the metal, transition-metal or semimetal oxide employed are nanoparticles or layers of oxides/hydroxides of Si, Al, Zr, Zn, Ti, or combinations thereof.

9. The process according to claim 6, wherein the phosphor is prepared by wet-chemical methods from organic or inorganic metal, semimetal, transition-metal or rare-earth metal salts, or mixtures thereof, by means of sol-gel processes or precipitation processes or both.

10. The process according to claim 6, wherein the coating is carried out with at least one metal, transition-metal or semimetal oxide by addition of aqueous or non-aqueous solutions of non-volatile salts, or organometallic compounds, or a mixture thereof.

11. The process according to claim 6, wherein the starting materials and the dopant are nitrates, carbonates, hydrogencarbonates, phosphates, carboxylates, alcoholates, acetates, oxalates, halides, sulfates, organometallic compounds, hydroxides or oxides of the metals, semimetals, transition metals or rare-earth metals, which are dissolved or suspended in inorganic or organic liquids.

12. The process according to claim 6, wherein the phosphor particles comprise at least one of the following phosphor materials:

(Ca,Sr,Ba)$_2$SiO$_4$:Eu or other silicates, in each case individually or mixtures thereof with one or more activator ions.

13. The process according to claim 12, wherein the activator ions are Ce, Eu, Mn, Mg or Zn.

14. An illumination unit having at least one primary light source whose emission maximum is in the range 250 nm to 530 nm, where some or all of this radiation is converted into a longer-wavelength radiation by surface-modified phosphor particles according to claim 1.

15. The illumination unit according to claim 14, wherein the light source is a luminescent indium aluminium gallium nitride of the formula In$_i$Ga$_j$Al$_k$N, where 0≤i, 0≤j, 0≤k, and i+j+k=1.

16. The illumination unit according to claim 15, wherein the phosphor is arranged directly on the primary light source or remotely therefrom.

17. The illumination unit according to claim 16, wherein the optical coupling between the phosphor and the primary light source is achieved by a light-conducting arrangement.

18. The illumination unit according to claim 17, wherein the light source is a material based on an organic light-emitting layer.

19. The illumination unit according to claim 18, wherein the light source is a source which exhibits electroluminescence, or photoluminescence or both.

20. A method comprising using at least one surface-modified phosphor particle according to claim 1 as conversion phosphor for conversion of primary radiation into a certain color point in accordance with the color-on-demand concept.

21. A method comprising using at least one surface-modified phosphor particle according to claim 1 for conversion of blue or near-UV emission into visible white radiation.

22. The surface modified phosphor particles according to claim 1, wherein the activator ions are Ce, Eu, Mn, Mg or Zn.

* * * * *